(No Model.)
H. LUCAS & J. ARCHER.
PEDAL FOR VELOCIPEDES.
No. 512,729. Patented Jan. 16, 1894.
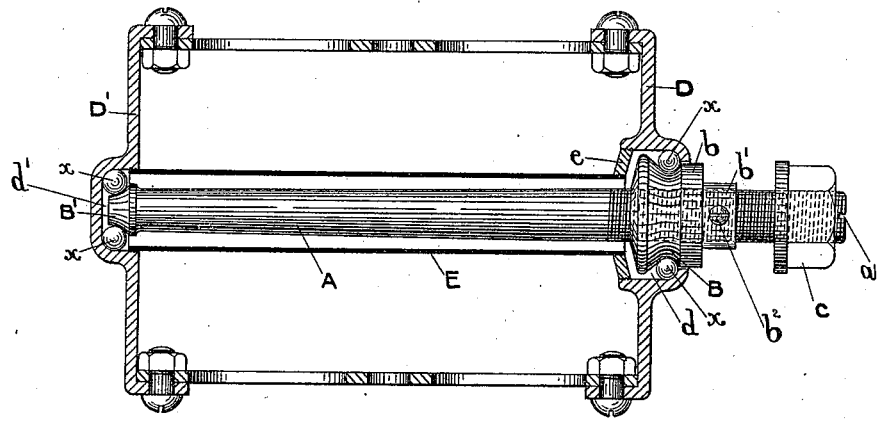
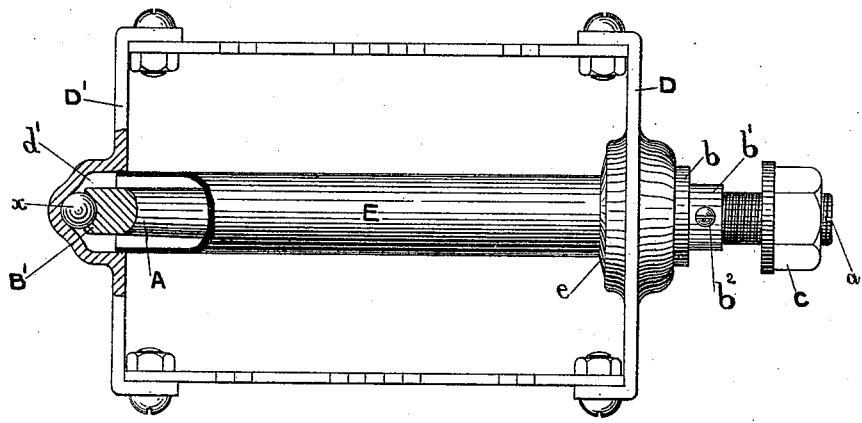
WITNESSES:
INVENTORS:

UNITED STATES PATENT OFFICE.

HARRY LUCAS AND JAMES ARCHER, OF BIRMINGHAM, ENGLAND.

PEDAL FOR VELOCIPEDES.

SPECIFICATION forming part of Letters Patent No. 512,729, dated January 16, 1894.

Application filed September 30, 1893. Serial No. 486,916. (No model.) Patented in England November 1, 1892, No. 19,627.

*To all whom it may concern:*

Be it known that we, HARRY LUCAS and JAMES ARCHER, both subjects of the Queen of Great Britain, residing at Birmingham, in the county of Warwick, England, have invented a new and useful Improvement in Pedals for Velocipedes, (for which we have obtained a patent in Great Britain, No. 19,627, bearing date the 1st day of November, 1892,) of which the following is a specification.

Our invention relates to an improved construction of ball bearing pedal for velocipedes and it consists in making the fixed cone on the outer end of the pedal pin, in mounting the adjustable cone on the inner end of the said pin, in making the bearing cups in the inner sides of the said plates of the pedal so that the adjustable cone is moved outward, *i. e.* toward the adjacent end of the pedal pin to take up the wear of the bearings, and in inclosing the bearing cups in the side plates of the pedal by means of the barrel inclosing the pedal pin, the object being to make the pedal dust-proof, to provide more efficient lubrication than at present obtains, to reduce weight, and to simplify manufacture. We attain these ends by the construction shown in the accompanying drawings, in which—

Figure 1 is a view in sectional plan of our improved pedal and Fig. 2 is a view in plan—partly in section—showing a modification thereof.

In both views similar parts are marked with like letters of reference.

The pedal pin A has a screw thread $a$ cut on its one end, on which is screwed an adjustable cone B having its apex pointing toward that end of the pedal pin on which it is threaded. On the apex end of the cone B is formed a collar $b$ which carries a projection $b'$ having two flat sides adapting it to fit in the slot in the crank of the machine to prevent the said cone turning when the bearings of the pedal are adjusted. Outside the cone B is a nut C adapted to lock the said cone and the pedal pin A to the crank of the machine. The other end of the pedal pin A is shaped to form a male cone B'.

The inner side plate D of the pedal is shaped to form, or it has fixed to it—on its inner side—a cupped recess $d$ adapted with the cone B on the pedal pin to form a race for the balls $x$ forming together the inner bearing of the pedal. The outer side plate D' of the pedal is shaped to form or it has fixed to it—on its inner side—a cupped recess $d'$ adapted with the cone B' on the pedal pin to form a race for the balls $x$ forming together the outer bearing of the pedal. The cupped recess $d$ in the side plate D has a central hole for the collar $b$ on the cone B to pass through but the recess $d'$ in the plate D' has no hole through it, so that the outer bearing of the pedal is sealed on the outside of the pedal.

As a modification the outer bearing of the pedal may consist of a single ball $x$ as shown by Fig. 2, in which case the cone B' at the outer end of the pedal pin is made of female shape as shown.

The side plates D and D' are connected together by a sleeve or barrel E which serves not only to cover the pedal pin but also to seal the bearings of the pedal on the inner sides of the side plates thereof. The one end of the sleeve or barrel E screws direct in the recess $d'$ in the side plate D' and the other end carries a disk $e$ which screws into the recess $d$ in the side plate D.

The plates D and D' carry foot bars either of the rat-trap type as shown by the accompanying drawings, or of the rubber type, the said foot bars being attached to the side plates either as shown or in any other convenient manner.

To adjust the bearings of the pedal the nut C used for fixing the pedal pin to the cranks of the machine is slackened, and the pedal pin is turned, which causes the adjustable cone to travel longitudinally thereon, as the said cone cannot rotate owing to the flattened projection carried by it engaging with the slot in the cranks. After the necessary adjustment is obtained the nut C is tightened which locks both the cone B and the pedal pin A to the crank of the machine.

To facilitate turning the pedal pin A to adjust the bearings of the pedal a screw-driver slot $a'$ is cut or formed in the threaded end $a$ thereof, and in order to provide against the adjustable cone B moving on the pedal pin when the nut C is being tightened up, a small set screw $b^2$ is screwed into the projection $b'$ of the cone B to impinge on the pedal pin and so lock the cone thereto.

The barrel E is provided with the usual hole for the introduction of a lubricant.

It will be seen that a pedal constructed as hereinbefore set forth is as dust-proof as it is possible to make it as it only has one unsealed opening into the bearings, viz., where the collar of the adjustable cone passes through the inner side plate, and that owing to the shape of the bearings they retain the lubricant thus insuring their perfect lubrication.

We wish it to be particularly understood that we do not limit ourselves to the precise details of construction hereinbefore described and illustrated by the accompanying drawings; but that we hold ourselves at liberty to make such changes and alterations as fairly fall within the spirit and scope of the invention.

What we claim, and desire to secure by Letters Patent, is—

1. In a pedal for a velocipede, the combination of a pin having a cone formed at one end, a screw-driver slot cut or formed in, and a screw thread cut on the other end thereof, the latter to receive an adjustable male cone and a nut for locking the pin to the crank of the machine; of the said adjustable cone threaded on the pedal pin so that its apex points toward the threaded end of the said pin and having a collar formed at its apex, the said collar carrying a projection having two flattened sides adapted to fit in the slot in the crank of the machine; of a set screw threaded into the projection on the adjustable cone and adapted to impinge on the pedal pin; of a nut threaded on the end of the pedal pin outside the adjustable cone and adapted to lock the said cone and the pedal pin to the crank of the machine; of two side plates adapted to carry the foot bars of the pedal and having cupped recesses in their inner sides, forming with the cones on the pedal pin races which with balls or spheres complete the bearings of the pedal; and of a barrel or sleeve carrying a disk at one end and adapted to screw into the cupped recesses in the side plates of the pedal to seal or close the said recesses and to inclose the pedal pin as set forth.

2. In a pedal for a velocipede the combination of a pin having a male cone cut or formed at one end and having a screw thread cut on the other end to receive an adjustable cone and a nut for locking the pedal pin to the crank of the machine; of the said adjustable cone threaded on the pedal pin so that its apex points toward the threaded end of the said pedal pin and having a collar formed at its apex, the said collar carrying a projection having two flattened sides adapted to fit in the slot in the crank of the machine; of a nut threaded on the pedal pin outside the adjustable cone and adapted to lock the said cone and the pedal pin to the crank of the machine; of two side plates adapted to carry the foot bars of the pedal and each having a cupped recess on its inner side the one adapted to form with the male cone on the end of the pedal pin and balls the outer bearing of the pedal, and the other adapted to form with the adjustable cone threaded on the pedal pin and balls the inner bearing of the pedal, and of a barrel or sleeve the one end of which is screwed in the cupped recess in the outer side plate of the pedal and the other end of which carries a disk adapted to screw into the cupped recess in the inner side plate of the pedal, as set forth.

HARRY LUCAS.
JAS. ARCHER.

Witnesses:
ERNEST HARKER,
J. J. WOODGATE.